(12) United States Patent
Goud et al.

(10) Patent No.: US 7,222,062 B2
(45) Date of Patent: May 22, 2007

(54) METHOD AND SYSTEM TO SUPPORT A TRUSTED SET OF OPERATIONAL ENVIRONMENTS USING EMULATED TRUSTED HARDWARE

(75) Inventors: Gundrala D. Goud, Olympia, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 566 days.

(21) Appl. No.: 10/745,119

(22) Filed: Dec. 23, 2003

(65) Prior Publication Data

US 2005/0138370 A1 Jun. 23, 2005

(51) Int. Cl.
*G06F 9/455* (2006.01)
(52) U.S. Cl. .................. 703/23; 713/200; 713/202; 713/193; 713/189; 463/29; 380/282; 711/100
(58) Field of Classification Search .............. 703/27, 703/23; 713/200, 202, 193, 189, 300, 182; 463/29; 380/282; 705/1; 711/100
See application file for complete search history.

(56) References Cited

U.S. PATENT DOCUMENTS

| | | | | | |
|---|---|---|---|---|---|
| 2002/0080974 | A1* | 6/2002 | Grawrock | .................. | 380/282 |
| 2003/0126454 | A1* | 7/2003 | Glew et al. | ................. | 713/193 |
| 2003/0188179 | A1* | 10/2003 | Challener et al. | ........... | 713/193 |
| 2003/0226031 | A1* | 12/2003 | Proudler et al. | ............ | 713/200 |
| 2004/0073806 | A1* | 4/2004 | Zimmer | ...................... | 713/189 |
| 2004/0205362 | A1* | 10/2004 | Catherman et al. | ......... | 713/300 |
| 2005/0055588 | A1* | 3/2005 | Nalawadi et al. | ........... | 713/300 |
| 2005/0081065 | A1* | 4/2005 | Brickell et al. | ............. | 713/202 |
| 2005/0086509 | A1* | 4/2005 | Ranganathan | ............... | 713/200 |
| 2005/0114686 | A1* | 5/2005 | Ball et al. | .................... | 713/193 |
| 2005/0114687 | A1* | 5/2005 | Zimmer et al. | ............. | 713/193 |
| 2005/0132122 | A1* | 6/2005 | Rozas | ........................ | 711/100 |
| 2005/0137889 | A1* | 6/2005 | Wheeler | ........................ | 705/1 |
| 2005/0138384 | A1* | 6/2005 | Brickell et al. | ............. | 713/182 |
| 2006/0100010 | A1* | 5/2006 | Gatto et al. | .................... | 463/29 |

OTHER PUBLICATIONS

Sugerman, J. et al., http://www.usenix.org/publications/library/proceedings/usenix01/sugerman/sugerman_html/node1.html, Aug. 29, 2003.
Sugerman, J. et al., http://www.usenix.org/publications/library/proceedings/usenix01/sugerman/sugerman_html/node2.html, Aug. 29, 2003.
TCG, "Introduction and Brief Technical Overview", Aug. 1, 2003, Trusted Computing Group.

* cited by examiner

*Primary Examiner*—Paul Rodriguez
*Assistant Examiner*—K Thangavelu
(74) *Attorney, Agent, or Firm*—Blakely, Sokoloff, Taylor & Zafman LLP

(57) ABSTRACT

A method and system to emulate a trusted platform module to execute trusted operations. A virtual machine monitor is executed to support a virtual machine session. An operating system is loaded into the virtual machine session. The trusted platform module is emulated to hold a key associated with the virtual session and to execute trusted operations.

27 Claims, 6 Drawing Sheets

METHOD AND SYSTEM TO SUPPORT A TRUSTED SET OF OPERATIONAL ENVIRONMENTS USING EMULATED TRUSTED HARDWARE

TECHNICAL FIELD

This disclosure relates generally to computer systems, and in particular but not exclusively, relates to emulating a trusted platform module to execute trusted operations.

BACKGROUND INFORMATION

In today's modern society privacy issues have become a major concern. Modern technologies such as computers and the Internet enable people to access more information at rates never before possible. However, many of the tasks for which people use the Internet are considered highly private or confidential matters. For example, the Internet has streamlined tasks such as banking, filing tax returns, conferencing with business associates, and communicating with friends and family.

Coupled with the advantages that accrue from the Internet is an increased susceptibility to malicious eavesdropping and/or cyber-attack. Thus, as the tools with which people conduct their daily affairs advance in complexity, so too must the means by which private or confidential matters are concealed and the communication tools safeguarded from evildoers and/or failures. As such, industry leaders have organized a Trusted Computing Group ("TCG") to address these concerns.

TCG is a an industry standards body, including computer manufacturers, device manufacturers, and software vendors who have a stake in promoting the security of computing platforms and devices (see, https://www.trustedcomputing-group.com). One goal of TCG is to promote a security chip called the trusted platform module ("TPM"). The TPM is defined by specifications published by the TCG, such as the TCG Main Specification, Version 1.1b, Feb. 22, 2002. The TPM is an isolated silicon device built into the motherboard of a personal computer ("PC"), but separate from the central processing unit ("CPU"), for establishing trust and trust metrics in a Trusted Computing Environment. "The TCG architecture and the TPM enable platform level authentication, attestation, and the generation and storage of cryptographic keys. The TPM can also perform certain operations on these keys such as signing and hashing within its protected locations. The TPM specifications are designed to enable this increased level of trust and security while maintaining privacy, user choice and control." TCG, Corp., *An Overview Of The TPM And The TCG's Trusted Platform Architecture*, Version 0.99D, (May 5, 2003).

Software vendors, such as Microsoft, have begun developing software platforms that will take advantage of the security features provided by a TPM silicon device. For example, a future version of Windows called Longhorn is expected to provide numerous security functions, including encryption, privacy safeguards, and digital rights management with use of the TPM silicon device.

However, widespread acceptance and implementation of the TCG architecture and the TPM is still uncertain. Furthermore, integration of the TCG architecture with network servers, where it is crucial to provide reliable, available, and serviceable functionality, has proven to be difficult. For example, some of the functionality defined by TCG architecture has been found to conflict with current techniques for "hot plugging" network servers.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments of a system and method for implementing trusted operations within a computing system using a virtual machine monitor and an emulated trusted platform module ("TPM") are described herein. In the following description numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
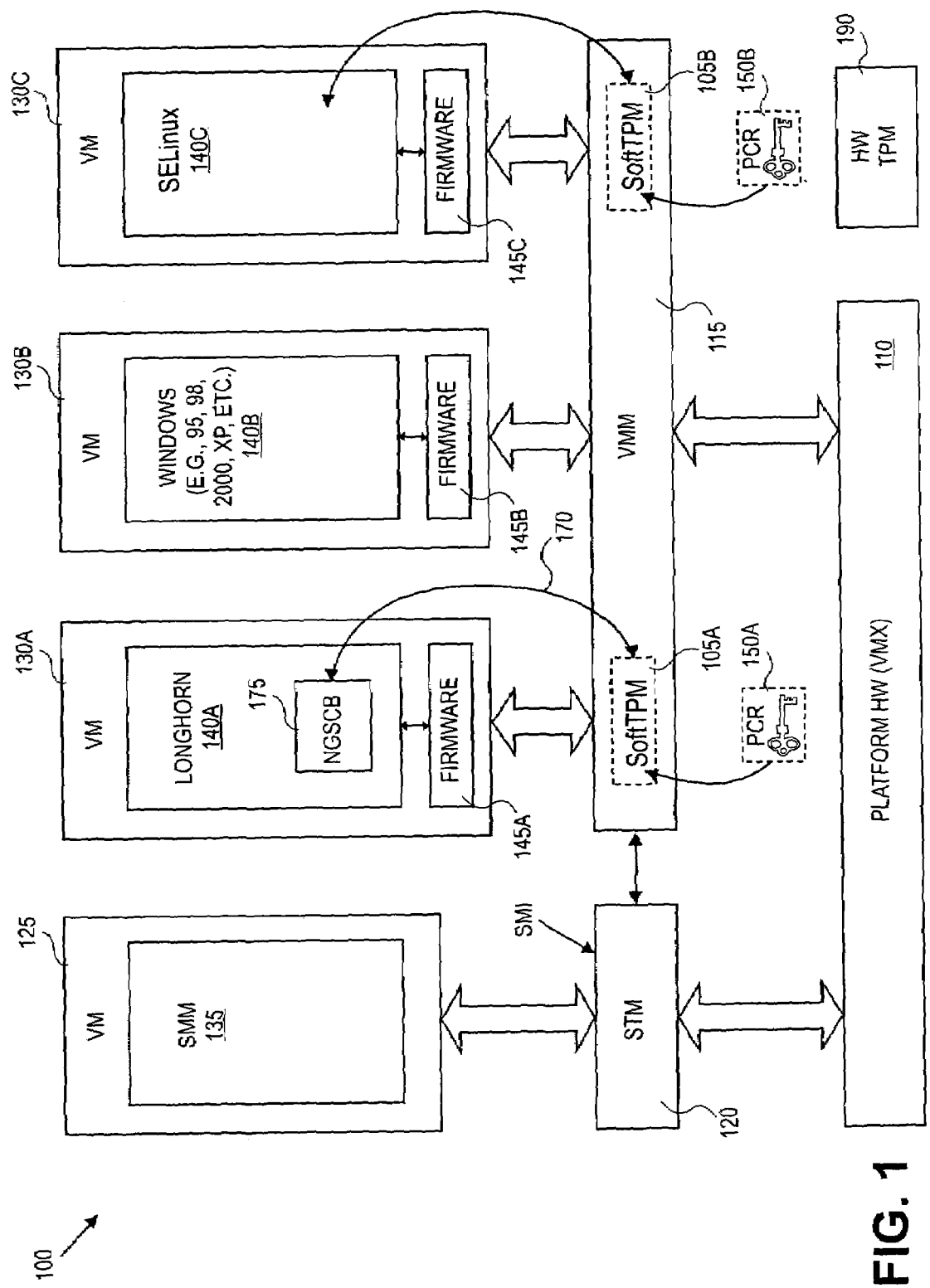
FIG. 1 is a block diagram illustrating a software environment for emulating a trusted platform module ("TPM") using a virtual machine monitor ("VMM"), in accordance with an embodiment of the present invention.

FIG. 1 is a block diagram illustrating a software environment 100 for implementing trusted operations using software TPMs ("SoftTPMs") 105, in accordance with an embodiment of the present invention. Software environment 100 is executed on platform hardware 110. The illustrated embodiment of software environment 100 includes a virtual machine monitor ("VMM") 115, a system management interrupt ("SMI") transfer monitor ("STM") 120, and virtual machine ("VM") sessions 125 and 130. Each VM session is capable of supporting either a system management mode ("SMM") 135 or an operating system ("OS") 140 and corresponding firmware 145. In the illustrated embodiment, each SoftTPM 105A, 105B includes a corresponding emulated platform configuration register ("PCR") 150A 150B respectively.

The elements of software environment 100 and platform hardware 110 interact as follows. VMM 115 operates to coordinate execution of VM sessions 130. In one embodiment, VMM 115 is firmware layered on top of platform hardware 110. Platform hardware 110 is hardware of a computer system, such a personal computer ("PC"), a blade server, or the like. VMM 115 provides a software layer to enable operation of one or more VM sessions, such as VM sessions 125 and 130A, 130B, and 130C. In general, VMM 115 acts as an arbitrator between the multiple VM sessions 125 and 130A, 130B, and 130C. VMM 115 allocates system resources of platform hardware 110 to each VM session, including one or more of memory, address space, input/output bandwidth, and processor runtime (e.g., time slicing).

In one embodiment, VMM 115 is a firmware driver executing within an extensible firmware framework standard known as the Extensible Firmware Interface ("EFI") (specifications and examples of which may be found at http://www.intel.com/technology/efi). EFI is a public industry specification that describes an abstract programmatic interface between platform firmware and shrink-wrap operating systems or other custom application environments. The EFI framework standard includes provisions for extending basic input output system ("BIOS") code functionality beyond that provided by the BIOS code stored in a platform's boot firmware device (e.g., see FIG. 5, non-volatile "NV" memory 510). More particularly, EFI enables firmware, in the form of firmware modules and drivers, to be loaded from a variety of different resources, including primary and secondary flash devices, ROMs, various persistent storage devices (e.g., hard disks, CD ROMs, etc.), and even over computer networks.

Each of VM sessions 130A, 130B, and 130C behaves like a complete physical machine that can run its own OS. Usually, each VM session is given the illusion by VMM 115 that it is the only physical machine. VMM 115 takes control whenever one of VM sessions 130A, 130B, and 130C attempt to perform an operation that may affect the operations of other VM sessions 130A, 130B, and 130C to ensure the whole computer system is not disrupted. Each of VM sessions 130A, 130B, and 130C supports corresponding one of OS's 140A, 140B, and 140C and firmware 145A 145B and 145C. Each OS 140A, 140B, and 140C can be different, as illustrated, or a separate instance of the same OS. Since VM sessions 130A, 130B, and 130C are separate entities and usually isolated from each other by VMM 115, if one of OS's 140A, 140B, and 140C crashes or otherwise becomes unstable, the other OS's 140A, 140B, and 140C should not be adversely affected.

In one embodiment, SoftTPMs 105 reside within VMM 115. SoftTPMs 105 are emulated TPMs that enable OS's 140A and 140C to execute trusted operations. In one embodiment, a SoftTPM is provided for each OS that desires trusted operation capability (e.g., SoftTPM 105A corresponds to OS 140A and SoftTPM 105B corresponds to OS 140C). In one embodiment, SoftTPMs 105 emulate the functionality of a hardware TPM embedded within a silicon device on a motherboard. In one embodiment, SoftTPMs 105 mimic the functionality of a hardware TPM defined by the Trusted Computing Group ("TCG") (e.g., TCG Main Specification, Version 1.1b, Feb. 22, 2002).

Although SoftTPMs 105 are not isolated from the processor or central processing unit ("CPU") on which they execute, SoftTPMs 105A and 105B are isolated from OS's 140 via VMM 115. By inserting VMM 115 underneath VM sessions 130 as an additional firmware layer, VMM 115 can monitor the operations of each OS 140 and prevent unauthorized access to each of SoftTPMs 105A and 105B. Thus SoftTPMs 105 can be used to securely hold secrets and perform trusted operations.

In effect, VMM 115 inserts an additional privilege level below OS's 140A, 140B, and 140C. For example, Intel x86 processors define four privilege levels to protect an OS and OS kernel drivers. These privilege levels are referred to as "rings," which range from 0 to 3. Windows™2000 uses only two of these four privilege levels, granting applications/drivers executing in the kernel mode ring 0 privileges and user applications executing in the user mode ring 3 privileges. Ring 0 grants access to all system resources, while ring 3 grants limited access to guard against inadvertent or malicious writes. Since OS's 140A, 140B, and 140C are supported within VM sessions 130A, 130B, and 130C, Os's 140 are unaware that VMM 115 has been inserted beneath them. The hardware support for VM sessions 130A, 130B, and 130C, known as virtual machine extensions ("VMX"), insert an additional four privilege levels (or rings) below the four rings currently available in x86 processors. In one embodiment, VMM 115 executes within these four new higher privilege levels. Thus, embodiments of VMM 115 can be seamlessly inserted below OS's 140A, 140B, and 140C and granted higher privileged access to platform hardware 110.

In one embodiment, VMM 115 protects SoftTPMs 105 from unauthorized access by hiding page table entries pointing to SoftTPMs 105 from the various OS's 140. Furthermore, VMM 115 can monitor all accesses to an individual SoftTPM. If a malicious application attempts to systematically search all memory locations within a computing system to locate one of SoftTPMs 105 and gain access to the secrets held therein, VMM 115 can block such an access and take appropriate action, including terminating the VM session from which the attack was sourced. Thus, embodiments of the present invention enable TPM related security without incurring the cost associated with a physical TPM.

In one embodiment, all of SoftTPM's 105 are emulated by VMM 115. In one embodiment, VMM 115 multiplexes various TPM commands or SoftTPM accesses into a single hardware TPM 190. Multiplexing multiple SoftTPM accesses into hardware TPM 190 enables VMM 115 to perform veritable TPM operations, such as "seal" and secure launch measured into hardware TPM 190, prior to invoking VM sessions 130 and generating SoftTPMs 105.

In one embodiment, SoftTPM 105A enable an authentication agent to determine the state of a particular OS 140 and "seal" data to the state of the particular OS 140. Subsequently, an authentication key stored in the corresponding one of SoftTPMs 105 may be returned in response to an authentication challenge to authenticate the particular OS 140, a portion thereof, or applications running on the particular OS 140. In one embodiment, the authentication key is stored in the corresponding PCR 150. PCRs 150 include one or more shielded-locations that are protected by VMM 115 from unauthorized access.

Embodiments of the present invention may optionally include STM 120. STM 120 acts as a virtual monitor similar to VMM 115, but supports the execution of a management mode of operation for platform hardware 110, such as SMM 135. SMM is specified by an *IA-32 Intel Architecture Software Developer's Manual, Volume 3: System Programming Guide* (2003) made available by Intel® Corporation.

Since the 386SL processor was introduced by the Intel® Corporation, SMM has been available on 32-bit Intel Architecture ("IA-32") processors as an operation mode hidden to operating systems that executes code loaded by firmware. SMM is a special-purpose operating mode provided for handling system-wide functions like power management, system hardware control, or proprietary original equipment manufacturer ("OEM") designed code. The mode is deemed transparent or "hidden" because pre-boot applications, OS's 140A, 140B, and 140C, and OS runtime software applications cannot see it, or even access it.

SMM 135 is accessed upon receipt of a system management interrupt ("SMI") 150. When an event generates an SMI, processor(s) of platform hardware 110 respond by saving a substantial part of their current state in a state save map and initialize some registers. VMM 115 hands off control over platform hardware 110 to STM 120, and SMM 135 begins execution within VM session 125. Upon completion of execution within SMM 135, STM 120 returns control of platform hardware 110 to VMM 115, which in turn resumes time sliced execution between VM sessions 130.

From the above discussion it should be appreciated that any number of VM sessions may be established over VMM 115. Furthermore, not all VM sessions established need support trusted operations that require a corresponding SoftTPM. For example, VM session 130B is illustrated as supporting OS 140B without a corresponding SoftTPM.

Figure 2:
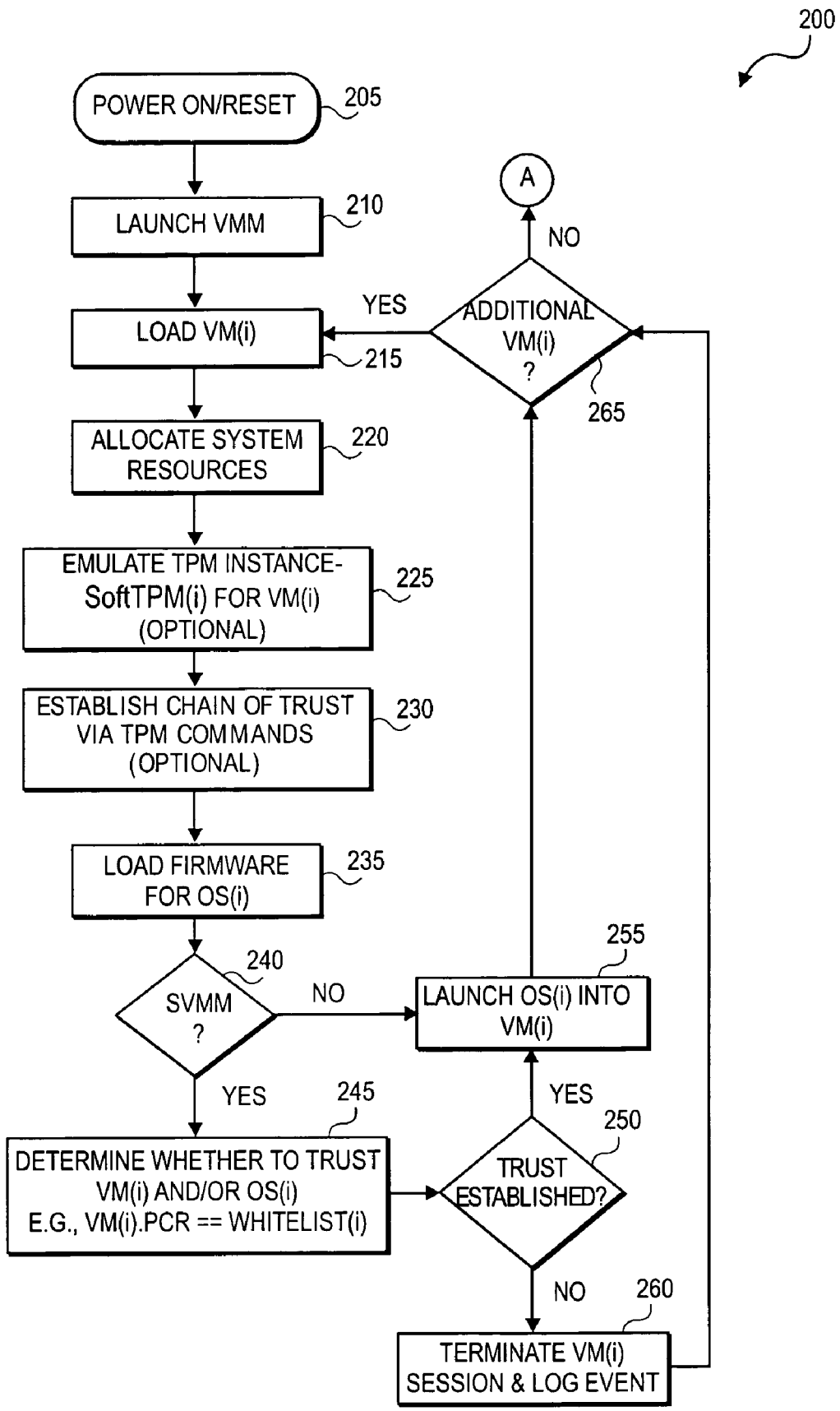
FIG. 2 is a flow chart illustrating a process to establish a software environment for executing trusted operations using emulated TPMs, in accordance with an embodiment of the present invention.

FIG. 2 is a flow chart illustrating a process 200 to establish software environment 100 for executing trusted operations using SoftTPMs 105, in accordance with an embodiment of the present invention.

In a process block 205, platform hardware 110 is powered on, power cycled, or otherwise reset. In a process block 210, VMM 115 is loaded into system memory of platform hardware 110 (e.g., see FIG. 5). In one embodiment, VMM 115 is loaded from a nonvolatile memory device, such as a firmware unit; however, VMM 115 may be stored on any storage device communicatively coupled to platform hardware 110, including a network storage device.

In a process block 215, a first instance of a VM session, illustrated as VM(i) in FIG. 2, is loaded in system memory. For example, the first instance could be VM session 130A. In a process block 220, VMM 115 allocates system resources to the established VM session. The allocated system resources may include a memory buffer, I/O bandwidth, processor bandwidth, and the like.

In a process block 225, an instance of a SoftTPM is generated to emulate the functionality of a hardware TPM. The instance of the SoftTPM is provided to enable a secure launch of an OS into the established VM session and to enable trusted operations to be executed once the OS has been loaded into the established VM session. In the illustrated example, SoftTPM 105A is generated along with its PCR 150A.

It should be appreciated that a SoftTPM need not be generated for a particular VM session, if trusted operations will not be executed in connection with that particular VM session. Thus, embodiments of the present invention support executing some OS's within VM sessions having a corresponding SoftTPM, while concurrently supported other OS's within other VM sessions not having a corresponding SoftTPM (e.g., VM session 130B and OS 140B).

Once the SoftTPM corresponding to an established VM session is generated/loaded, the SoftTPM may be used to execute trusted operations. In a process block 230, the SoftTPM may be used to establish a "chain of trust." Establishing a chain of trust entails validating each portion of code executed before executing another portion of code. In one embodiment, a portion of code may be validated by running a hash function on the portion of code and comparing the result of the hash function against a key stored in a PCR of the SoftTPM. A hashing function (a.k.a. a cryptographic hash function) is an algorithm that turns a variable-sized data block into a fixed-sized hash value (a.k.a. a cryptographic checksum). Hashing functions are often used to create digital signatures, for example, digital signatures are often a secure hash algorithm-i ("SHA-1") that is encrypted using asymmetric cryptography, such as Rivest-Shamir-Adleman ("RSA") cryptography. The SoftTPM may be used to establish a chain of trust for all drivers and applications of an OS to be loaded into the established VM session. Again, it should be appreciated that establishing a chain of trust is optional and need not occur for all code loaded into a VM session.

Once the VM session is loaded and system resources allocated, OS firmware is loaded into the VM session, in a process block 235. The OS firmware is loaded into the VM session to support an OS that may subsequently be loaded. The OS firmware may include basic input output system ("BIOS") software, EFI software, or other similar software/firmware to act as a proxy between an OS and OS applications and platform hardware 110. In the illustrated example, firmware 145A is loaded into VM session 130A.

In a decision block 240, it is determined whether a secure virtual monitor mode ("SVMM") is enabled. If the SVMM is enabled, then VMM 115 will determine whether to trust a particular OS prior to, during, or immediately after loading the OS into the established VM session. In one embodiment, enabling the SVMM simply enables a whitelist/blacklist functionality of whether to trust any given OS.

If the SVMM is enabled, process 200 continues to a process block 245. In process block 245, it is determined whether to trust an OS prior to loading the OS. In one embodiment, trust is established by executing a hash function on a portion of a storage disk containing the pre-loaded OS. In one embodiment, if the hash value matches a whitelist, in decision block 250 trust has been established and the OS may be loaded into the VM session in a process block 255. However, if the hash value of the OS currently stored on the storage disk and waiting to be loaded into the established VM session fails to match a hash value on the whitelist, then trust has not been established in decision block 250 and process 200 continues to a process block 260.

In process block 260, VMM 115 has determined it cannot trust the OS and therefore does not load the untrusted OS into the established VM session. Rather, VMM 115 terminates the established VM session and generates a log entry to document the untrusted OS.

Returning to decision block 240, if the SVMM is not enabled, then process 200 continues straight to process block 255. Whether or not to enable SVMM is a policy decision that may be set by a user or system administrator of platform hardware 110. As described above in connection with process block 255, the OS is loaded into the established VM session. Thus, if SVMM is disabled, the OS is loaded without regard for establishing trust.

In either case where the OS is loaded into the established VM session in process block 255 or where the OS is deemed untrustworthy and the established VM session terminated, process 200 continues from process block 255 to a decision block 265. In decision block 265, VMM 115 determines whether there are additional VM sessions to load to support additional OS's. If there are no more VM sessions and therefore no other OS's to load, process 200 continues to a process 300, illustrated in FIG. 3. On the other hand, if there are additional VM sessions to load, then process 200 returns to process block 215 and continues therefrom as described above. Process 200 will loop around as many times as there are VM sessions and OS's to load and support. Thus, embodiments of the present invention enable loading multiple VM sessions 130 to support multiple OS's 140, concurrently.

Figure 3:
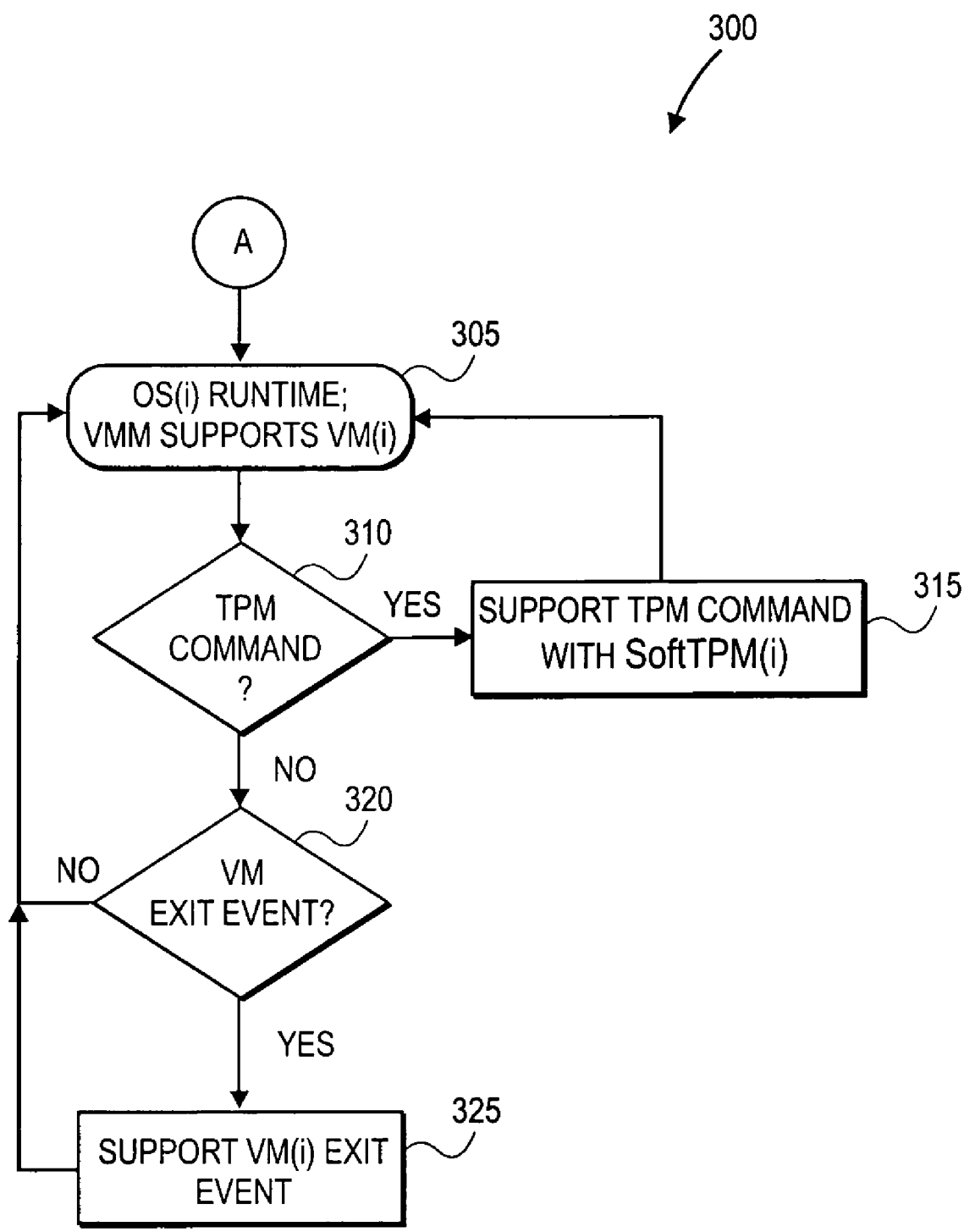
FIG. 3 is a flow chart illustrated a process for supporting trusted operations during an operating system runtime using an emulated TPM, in accordance with an embodiment of the present invention.

FIG. 3 is a flow chart illustrating a process 300 for supporting trusted operations in connection with one or more VM sessions 130 during OS runtimes of OS's 140, in accordance with an embodiment of the present invention. Process 300 continues from off page reference "A" in FIG. 2.

Once an OS has been loaded into an established VM session, the corresponding SoftTPM may be executed to support trusted commands in connection with the OS. For example, once OS 140A is loaded into VM session 130A via process 200, SoftTPM 105A may be executed to perform trusted commands during the OS runtime. Thus, embodiments of the present invention are not limited to using SoftTPMs 105 for determining whether a particular OS may be trusted, but rather may be executed to support a wide variety of trusted operation into the OS runtime. For the sake of clarity, process 300 will be described in connection with VM session 130A; however, process 300 is equally applicable to any VM session 130 where a corresponding SoftTPM 105 is executed to provide trusted operations to the OS 140 (e.g., OS 140C).

In a process block 305, OS 140A is executing in OS runtime within VM session 130A. Requests to interact with platform hardware 110 received from OS 140A (and/or applications executing on OS 140A) are managed by VMM 115. In a decision block 310, VMM 115 determines whether a request from within VM session 130A is a TPM command. A TPM command may include a seal command, a hash command, a secure enter command, or the like. In general, TPM commands are sent to a well-known port address. In one embodiment, VMM 115 monitors this well-known port address and traps the TPM command. Instead of sending the TPM command to a hardware TPM, VMM 115 redirects the TPM command to SoftTPM 105A. In a process block 315, SoftTPM 105A supports the desired TPM command. Once SoftTPM 105A completes execution of the TPM command, process 300 returns to process block 305 and waits for another TPM command. If there is a hardware TPM present, such as hardware TPM 190, VMM 115 may redirect TPM commands to the hardware TPM.

FIG. 1 illustrates an example TPM command 170 originating from a Next Generation Secure Computing Base ("NGSCB") 175 within OS 140A. NGSCB 175 invokes SoftTPM 105A with TPM command 170 to execute trusted operations to ensure system integrity and provide information security and personal privacy via the ability to encrypt secrets, decrypt secrets, and securely store secrets using SoftTPM 105A and PCR 150A.

Returning to decision block 310, if a TPM command has not been received, then process 300 continues to a decision block 320. In decision block 320, VMM 115 determines whether a VM exit event has been requested. A VM exit event is a request to suspend processing within a given VM session. A VM exit event may occur when VMM 115 time slices multiple VM sessions 130 on a single processor and is about to switch to another VM session. If a VM exit event occurs, then VMM 115 supports the VM exit event in a process block 325 and process 300 returns to process block 305 thereafter. If a VM exit event did not occur in decision block 320, then process 300 returns to process block 305 where VMM 115 supports the VM session 105A as needed.

Figure 4:
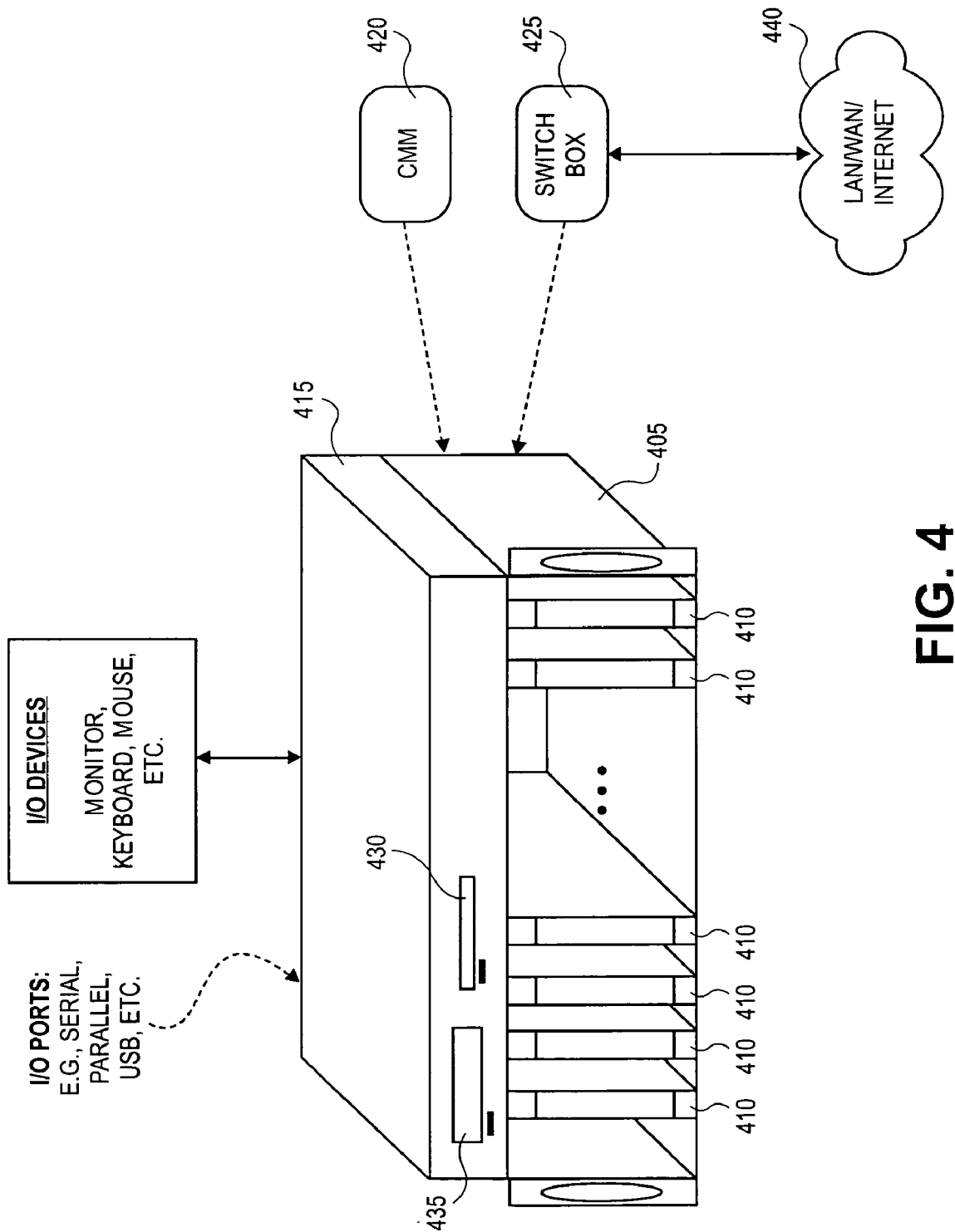
FIG. 4 is an isometric view of a chassis including processing blades for implementing trusted operations using an emulated TPM, in accordance with an embodiment of the present invention.

FIG. 4 is an isometric view of a rack of processing blades for implementing trusted operations using SoftTPMs 105, in accordance with an embodiment of the present invention. The illustrated embodiment includes a chassis 405, processing blades 410, and a media tray 415. Chassis 405 includes a chassis management module ("CMM") 420 and a switch box 425. Media tray 415 optionally rests on top of chassis 405 and provides processing blades 410 with shared resources such as I/O ports (e.g., serial port, parallel port, universal serial bus port), I/O devices (e.g., monitor, keyboard, mouse), a CD-ROM drive 430, a floppy drive 435, and the like. Switch box 425 provides processing blades 410 with switchable access to a network 440 (e.g., local area network, wide area network, Internet). Typically, CMM 420 is an independent hardware module with dedicated firmware to perform management functions, such as for example, coordinating arbitration and allocation of shared resources between processing blades 410, logging system errors, coordinating fault resilient booting of processing blades 410, fan control, power supply monitoring and regulation, and the like.

Figure 5:
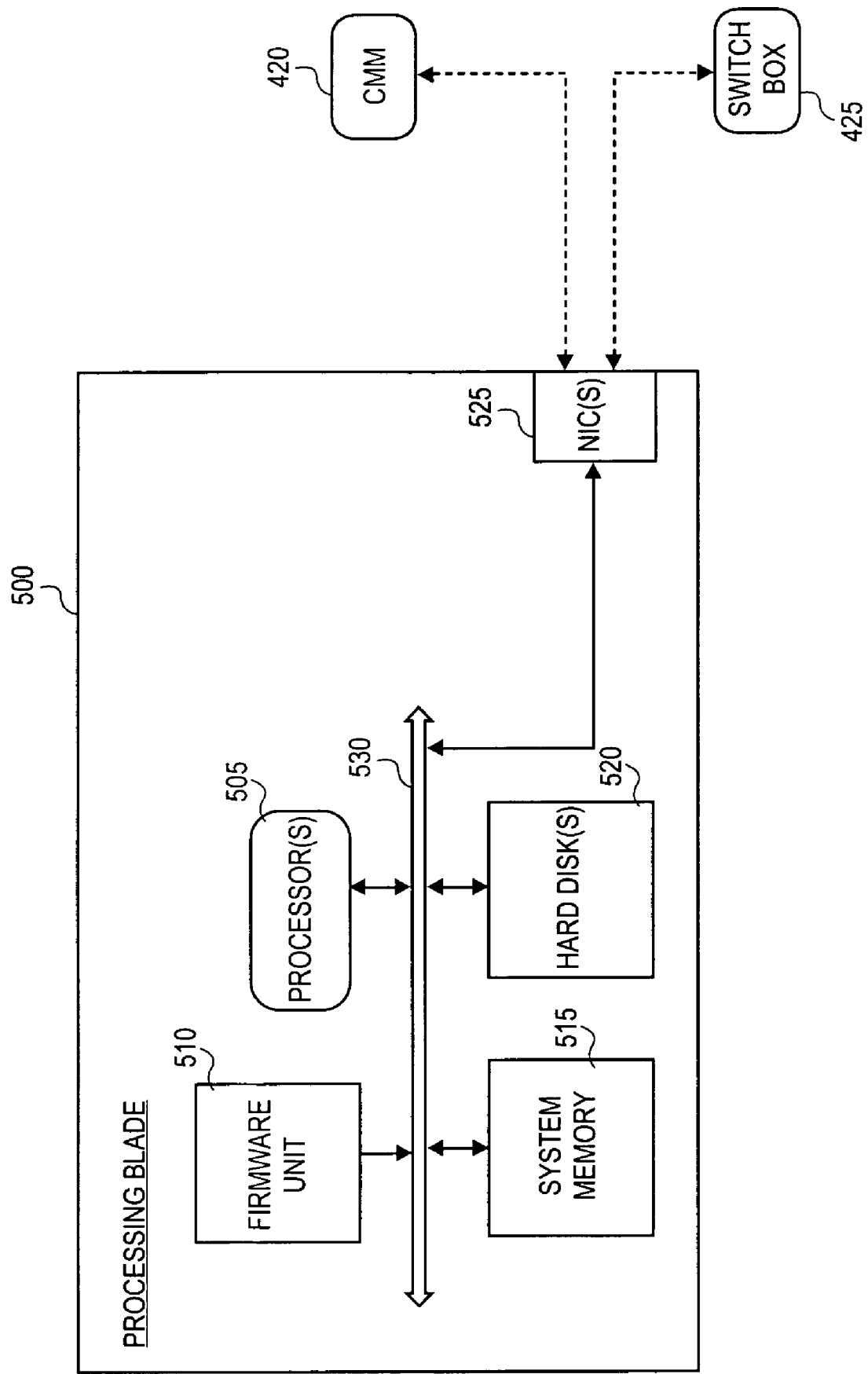
FIG. 5 is a block diagram illustrating a processing blade for implementing trusted operations using an emulated TPM, in accordance with an embodiment of the present invention.

FIG. 5 is block diagram illustrating a processing blade 500, which is one embodiment of processing blades 410. The illustrated embodiment of processing blade 500 also represents one embodiment of platform hardware 110 (see FIG. 1). The illustrated embodiment of processing blade 500 includes one or more processor(s) 505, a firmware unit 510, system memory 515, one or more hard disk(s) 520, one or more network interface card(s) ("NICs") 525, and a system bus 530.

The elements of processing blade 500 are interconnected as follows. Processor(s) 505 are communicatively coupled to firmware unit 510, system memory 515, hard disk(s) 520, and NIC(s) 525 via system bus 530 to send and to receive instructions thereto/therefrom. In one embodiment, firmware unit 510 is a flash memory device. In other embodiments, firmware unit 510 includes any one of read only memory ("ROM"), programmable ROM, erasable programmable ROM, electrically erasable programmable ROM, or the like. In one embodiment, system memory 515 includes random access memory ("RAM"). Hard disk(s) 520 may optionally include one or more of an integrated drive electronic ("IDE") hard disk, an enhanced IDE ("EIDE") hard disk, a redundant array of independent disks ("RAID"), a small computer system interface ("SCSI") hard disk, and the like.

It should be appreciated that various other elements of processing blade 500 have been excluded from FIG. 5 and this discussion for the purposes of clarity. Furthermore, the illustrated embodiment of processing blade 500 is only one possible embodiment of platform hardware 110. One of ordinary skill in the art having the benefit of the present disclosure will understand various modifications to the architecture of processing blade 500 may be implemented.

Figure 6:
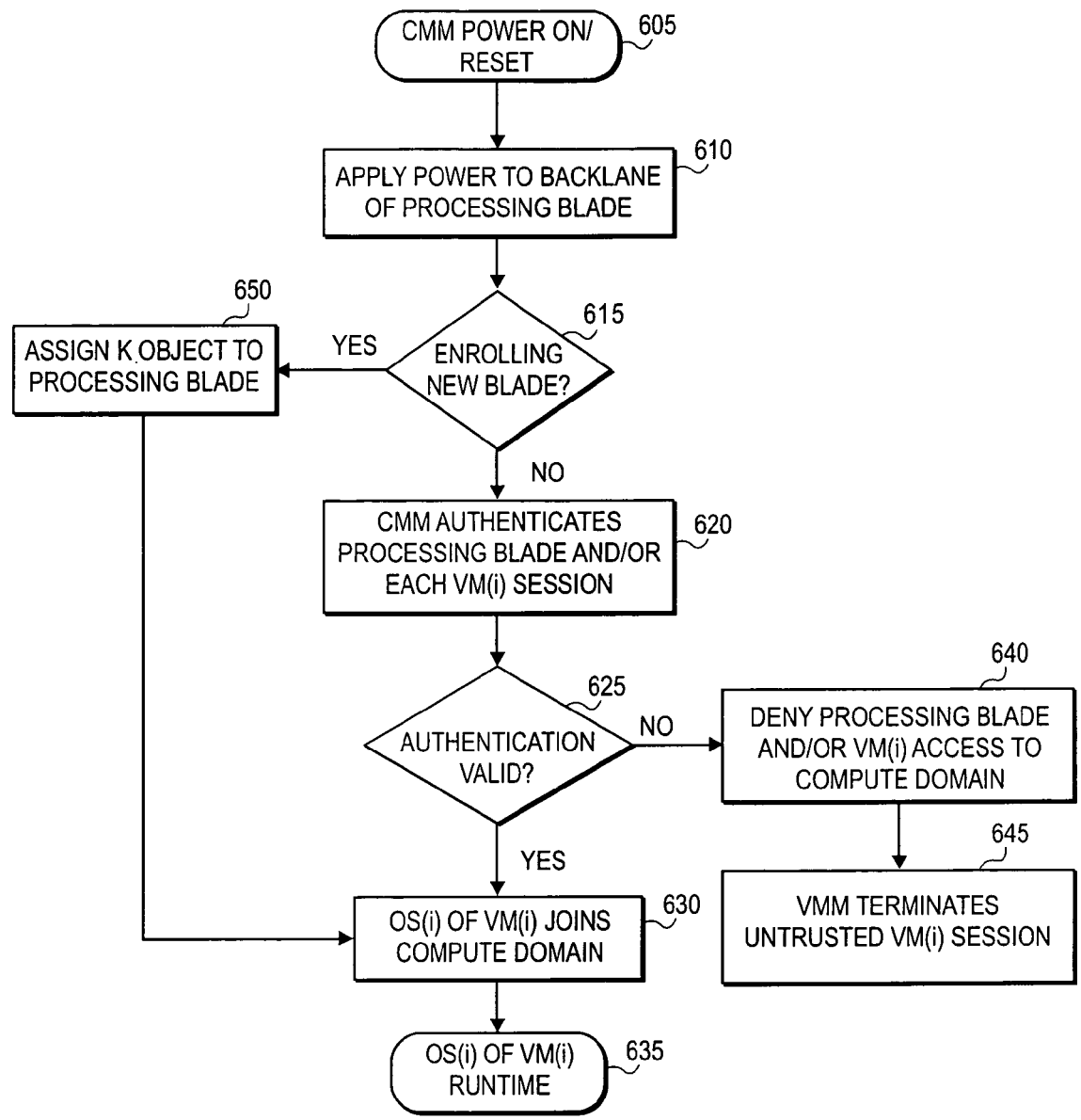
FIG. 6 is a flow chart illustrating a process for authenticating processing blades and/or operating systems executing within VMs executing on the processing blades, in accordance with an embodiment of the present invention.

FIG. 6 is a flow chart illustrating a process 600 for authenticating processing blades 410 and/or OS's 140 executing on processing blades 410, in accordance with an embodiment of the present invention.

In a process block 605, CMM 420 is powered on, power cycled, or otherwise reset. In a process block 610, power is applied to a backplane of chassis 405. Powering the backplane of chassis 405 delivers power to each of the individual processing blades 410. Once power is provided, each of processing blades 410 comes alive and begins requesting permission to access a network domain, such as network 440.

In a decision block 615, CMM 605 determines whether a new processing blade 410 is enrolling or otherwise registering with CMM 605. A new processing blade 410 may need to enroll with CMM 605 if a new processing blade has been inserted into chassis 405 or a newly provisioned processing blade 410 has been reset. If it is determined in decision block 615 that a new processing blade is not enrolling, then process 600 continues to a processing block 620.

In process block 620, CMM 420 attempts to authenticate each processing blade 410 attempting to sign onto or gain access to network 440 or a particular domain of network 440. In one embodiment, authenticating one of processing blades 410 may include authenticating hardware of the processing blade. In the case of a hardware authentication, a private key stored within a hardware device of the processing blade may be compared against a public key obtained from a trusted third party. Other known schemes of authenticating hardware may be employed.

In one embodiment, authenticating the processing blade may include authenticating each OS 140 executing within a VM session 130 that attempts to gain access to network 440 or a particular domain thereof. In one embodiment, CMM 420 may include a TPM (emulated or hardware) of its own to execute hash functions on each of the OS's 140 loaded within a corresponding one of VM sessions 130. In this case, if the hash value of a particular OS fails to match a whitelist maintained by CMM 420, then the untrustworthy OS will not be authenticated. In an alternative embodiment, SoftTPMs 105 and VMM 115 may individually authenticate each of the OS's 140 loaded into VM sessions 130 as described above and report back to CMM 420 the results of the individual authentications. In yet another embodiment, a two level authentication technique may be employed by CMM 420 and VMM 115. In this two level authentication technique, CMM 420 may execute a hash function or other authentication technique only on VMM 115 and/or SoftTPMs 105 to determine whether to trust VMM 115 and SoftTPMs 105. In turn, VMM 115 and SoftTPMs 105 authenticate each individual OS 140, as described above. It should be appreciated that one of ordinary skill in the art having the benefit of the instant disclosure may modify process 600 in a number of different ways to authenticate one or more processing blades 410 and/or OS's 140 executing on each processing blade 410.

It should further be appreciated that not all processing blades 410 need be authenticated or authenticated with the same level of scrutiny. For example, the rigorousness with which each processing blade 410 is authenticated may depend upon the function executed by the particular processing blade 410 and/or the domain of network 440 to which an OS executing on the particular processing blade 410 is attempting to gain access.

If the particular processing blade 410 and/or OS 140 is authenticated in a decision block 625, process 600 continues to a process block 630. In process block 630, the particular OS 140 (e.g., OS 140A) is granted permission to join network 440. In a process block 635, the particular OS 140 commences OS runtime within its corresponding VM session 130 with access to network 440.

Returning to decision block 625, if the particular processing blade 410 fails to authenticate, then process 600 continues to a process block 640. In process block 640, CMM 420 denies the particular processing blade 410 access to network 440. Alternatively, if one of OS's 140 executing on the particular processing blade 410 fails to authenticate, then the untrustworthy OS 140 is denied access to network 440 in process block 640. If one OS 140 (e.g., OS 140A) is authenticated, while another OS 140 (e.g., OS 140C) fails to authenticate, then CMM 420 can grant access to the trusted OS 140 in process block 630 while denying access to the untrustworthy OS 140 in process block 640. In a process block 645, the untrusted OS 140 along with its corresponding VM session 130 is terminated by VMM 115.

Returning to decision block 615, if a new processing blade 410 is being enrolled, then process 600 continues to a process block 650. In process block 650, CMM 420 assigns the new processing blade a K object. A K object may include any unique data object that may be used to uniquely identify the new processing blade 410 or an environment executing on the new processing blade 410. The K object may include a key obtained from a trusted third party, such as a hardware or software vendor. The assigned K object is subsequently used to authenticate the new processing blade 410 when the new processing blade attempts to access network 440 a second time. After the K object is assigned to the new processing blade 410, the new processing blade 410 joins network 440 in a process block 630. Alternately, the K object could be a composite hash of all VM sessions 130, an SHA-1 hash of VMM 115, or the like.

In yet another embodiment, the K object may be an X509V3 certificate defined by the ITU-T X.509 international standard with a public key. In this embodiment, CMM 420 will use the public key to issue a challenge to the new processing blade 410. The new processing blade 410 will have embedded within its system a private key. The challenge may proceed as follows:

CMM: Retrieve K=Cert (Kpub, SerialNumberOfBlade)
CMM: Ensure that K good & not revoked from Trusted Third Party (e.g., Verisign)
CMM: If K bad, disallow blade access.
CMM: Encrypt (Kpub, RandomNumber)=ChallengeBlob
CMM: Send ChallengeBlob to Blade
Blade: Decrypt (Kprivate, ChallangeBlock)=ChallengeResponse
Blade: Reply with {ChallengeResponse, SerialNumberOfBlade}
CMM: If (ChallengeBlock==ChallengeResponse) && (SerialNumberOfBlade=Cert's SerialNumberOfBlade) Then Allow Blade Onto the Network.

Embodiments of the present invention enable operating system and applications to execute trusted operations without need of a hardware TPM. In many cases, processor tailored for server applications fail to support secure machine extensions ("SMX") needed to take full advantage of secure functionality provided by a TPM. Thus, embodiment of the present invention enable such server based processors to execute trusted operations without supporting SMX.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for implementing trusted operations within a computing system using an emulated trusted platform module (TPM), comprising:
   loading a virtual machine monitor (VMM) to support a virtual machine (VM) session;
   loading the VM session;
   loading an operating system (OS) into the VM session; and
   emulating a trusted platform module (TPM) to hold a key associated with the VM session and to execute trusted operations;
   determining whether the OS is trustworthy using the key held within the emulated TPM; and
   terminating the VM sessions along with the OS, if the OS is determined to be untrustworthy.

2. The method of claim 1 wherein emulating the TPM comprises emulating the TPM under the control of the VMM, the VMM to prevent unauthorized access to the key held within the emulated TPM.

3. The method of claim 2 wherein the VMM comprises a layer of software executing below the VM session and having a higher privileged access to system resources than the OS.

4. The method of claim 3 wherein TPM commands originating from within the VM session to execute the trusted operations are trapped and redirected to the emulated TPM.

5. The method of claim 1 wherein determining whether the OS is trustworthy comprises determining whether the OS has an unauthorized modification via:
   hashing at least a portion of the OS to obtain a hash value; and
   comparing the hash value to the key held within the emulated TPM.

6. The method of claim 1, further comprising:
   loading a plurality of VM sessions and a plurality of OS's, each one of the plurality of OS's loaded into one of the plurality of VM sessions; and
   emulating a plurality of TPMs each corresponding to one of the plurality of VM sessions, each of the plurality of TPMs to hold a key associated with the corresponding one of the plurality of VM sessions and to execute trusted operations.

7. The method of claim 6, further comprising:
   determining whether each of the plurality of OS's is trustworthy using the key associated with each of the plurality of VM sessions; and
   terminating any of the plurality of VM sessions supporting an OS determined to be untrustworthy.

8. The method of claim 1 wherein the trusted operations include at least one of encrypting data, decrypting data, hashing, and sealing data to a software environment.

9. The method of claim 1, further comprising:
   denying the OS access to a network domain, if the OS is determined to be untrustworthy.

10. The method of claim 9 wherein denying the OS access to the network domain comprises a management module of a rack of blade servers denying a blade server, executing the OS within the VM session access to the network domain.

11. The method of claim 1 wherein the emulated TPM simulates the functionality of a hardware TPM compliant with a Trusted Computing Group's (TCG) trusted platform architecture.

12. A machine-readable storage medium that provides instructions that, when executed by a machine, will cause the machine to perform operations for implementing trusted operations within a computing system using an emulated trusted platform module (TPM), comprising:
   executing a virtual machine monitor (VMM) to support a virtual machine (VM) session;
   executing the VM session;
   executing an operating system (OS) within the VM session; and
   emulating a trusted platform module (TPM) to hold a key associated with the VM session, the VMM to prevent unauthorized access to the key, wherein emulating the TPM further comprises emulating the TPM to allow software applications executing within the OS to establish trust via TPM commands.

13. The machine-readable storage medium of claim 12 wherein the VMM comprises a layer of software executing below the VM session and having a higher privileged access to system resources than the OS.

14. The machine-readable storage medium of claim 12 wherein the TPM commands are trapped and redirected to the emulated TPM.

15. The machine-readable storage medium of claim 12, further providing instructions that, if executed by the machine, will cause the machine to perform operations, comprising:
   determining whether the OS is trustworthy using the key held within the emulated TPM; and
   terminating the VM session along with the OS, if the OS is determined to be untrustworthy.

16. The machine-readable storage medium of claim 15 wherein determining whether the OS is trustworthy comprises determining whether the OS has an unauthorized modification via:
   hashing at least a portion of the OS to obtain a hash value; and
   comparing the hash value to the key.

17. The machine-readable storage medium of claim 12, further providing instructions that, if executed by the machine, will cause the machine to perform operations, comprising:
   executing the VMM to support a plurality of VM sessions;
   executing a plurality of VM sessions;
   executing a plurality of OS's, each one of the plurality of OS's executed within one of the plurality of VM sessions; and
   emulating a plurality of TPMs each corresponding to one of the plurality of VM sessions, each of the plurality of TPMs to hold a key associated with the corresponding one of the plurality of VM sessions.

18. The machine-readable storage medium of claim 17, further providing instructions that, if executed by the machine will cause the machine to perform operations, comprising:
   determining whether each of the plurality of OS's is trustworthy using the key associated with each of the plurality of VM sessions; and
   terminating any of the plurality of VM sessions supporting an OS determined to be untrustworthy.

19. A system for implementing trusted operations within a computing system using an emulated trusted platform module (TPM), comprising:

a processor to execute a virtual machine monitor (VMM) to support a virtual machine (VM) session;

system memory communicatively coupled to the processor; and a data storage unit (DSU) communicatively coupled to the processor and the system memory and having instructions stored therein to generate the VMM and the emulated trusted platform module (TPM), the processor coupled to load the VMM from the DSU into the system memory, the VM session to support an operating system (OS) therein, the emulated TPM to execute trusted operations, wherein the DSU comprises a firmware unit and the VMM comprises a firmware layer to execute below the VM session, the VMM having a higher privileged access to the system memory.

20. The system of claim 19 wherein the emulated TPM is further to securely hold a key for executing at least a portion of the trusted operations.

21. The system of claim 20 wherein the VMM prevents unauthorized access to the key securely held by the emulated TPM via hiding a memory location of the key.

22. The system of claim 21 wherein the processor is further coupled to execute the VMM and the emulated TPM to determine whether the OS is trustworthy via executing one of the trusted operations using the key and to terminate the VM session along with the OS, if the OS is determined to be untrustworthy.

23. The system of claim 19 wherein the emulated TPM emulates the functionality of a TPM compliant with a Trusted Computing Group's (TCG) trusted platform architecture.

24. A system for implementing trusted operations within a server system using an emulated trusted platform module (TPM), comprising:

a management module;

a plurality of blades mounted within a chassis and communicatively coupled to the management module, the plurality of blades each including a data storage unit (DSU) having stored therein instructions to generate the emulated trusted platform module (TPM) to hold a key; and a switch communicatively coupled to the management module and the plurality of blades, the switch to provide the plurality of blades access to a network domain, the switch to deny access of a blade to the network domain, if that one of the plurality of blades is determined to be untrustworthy based on the key.

25. The system of claim 24 wherein the DSU of each of the plurality of blades has further stored therein instructions to generate a virtual machine monitor (VMM) to protect the emulated TPM from unauthorized access and to support a virtual machine (VM) session, the VM session to support an operating system (OS) therein.

26. The system of claim 25 wherein the one of the plurality of blades is determined to be untrustworthy based on the key, if a hash of a portion of the OS fails to correspond to the key.

27. The system of claim 25 wherein the key comprises a private key and wherein the one of the plurality of blades is determined to be untrustworthy, if the private key fails to correspond to a public key obtained from a trusted third party.

* * * * *

UNITED STATES PATENT AND TRADEMARK OFFICE
CERTIFICATE OF CORRECTION

| | |
|---|---|
| PATENT NO. | : 7,222,062 B2 |
| APPLICATION NO. | : 10/745119 |
| DATED | : May 22, 2007 |
| INVENTOR(S) | : Goud et al. |

Page 1 of 1

It is certified that error appears in the above-identified patent and that said Letters Patent is hereby corrected as shown below:

In column 3, at line 3, delete "150A 150B" and insert --150A, 150B,--.

In column 3, at line 4, delete "respectivly" and insert --respectively--.

In column 6, at line 10, delete "algorithm-i" and insert --algorithm-1--.

Signed and Sealed this

Twenty Second Day of April, 2008

JON W. DUDAS
*Director of the United States Patent and Trademark Office*